(12) United States Patent
Cao

(10) Patent No.: US 9,227,160 B2
(45) Date of Patent: Jan. 5, 2016

(54) GAS SEPARATION MODULES AND METHODS FOR FORMING

(71) Applicant: The Boeing Company, Seal Beach, CA (US)

(72) Inventor: Tuan Q Cao, Seattle, WA (US)

(73) Assignee: THE BOEING COMPANY, Chicago, IL (US)

( * ) Notice: Subject to any disclaimer, the term of this patent is extended or adjusted under 35 U.S.C. 154(b) by 107 days.

(21) Appl. No.: 13/755,656

(22) Filed: Jan. 31, 2013

(65) Prior Publication Data
US 2014/0208948 A1 Jul. 31, 2014

(51) Int. Cl.
| | | |
|---|---|---|
| *B01D 53/22* | (2006.01) | |
| *B01D 63/02* | (2006.01) | |
| *B01D 63/04* | (2006.01) | |
| *B64D 37/32* | (2006.01) | |
| *B82Y 30/00* | (2011.01) | |

(52) U.S. Cl.
CPC .............. *B01D 63/022* (2013.01); *B01D 53/22* (2013.01); *B01D 63/043* (2013.01); *B01D 2053/224* (2013.01); *B01D 2256/10* (2013.01); *B01D 2257/104* (2013.01); *B01D 2259/4575* (2013.01); *B01D 2313/13* (2013.01); *B64D 37/32* (2013.01); *B82Y 30/00* (2013.01); *Y10S 977/773* (2013.01); *Y10S 977/833* (2013.01); *Y10T 156/1052* (2015.01); *Y10T 156/1064* (2015.01)

(58) Field of Classification Search
CPC .... B01D 63/02; B01D 53/268; B01D 63/022; B01D 63/043; B01D 53/22; B01D 2053/224; B01D 2256/10; B01D 2257/104; B01D 2259/4575; B01D 2313/13; B64D 37/32; B82Y 30/30; Y10S 977/773; Y10S 977/833; Y10T 156/1064; Y10T 156/1052
USPC ......................................................... 96/8, 10
See application file for complete search history.

(56) References Cited

U.S. PATENT DOCUMENTS

| | | | | |
|---|---|---|---|---|
| 3,392,510 A | * | 7/1968 | Koch, Jr. ............................ 96/8 |
| 4,138,460 A | * | 2/1979 | Tigner ........................... 264/159 |

(Continued)

OTHER PUBLICATIONS

"machine" The American Heritage Dictionary of the English Language, Fourth Edition copyright 2000 by Houghton Mifflin Company. Updated in 2009. Published by Houghton Mifflin Company.*

(Continued)

*Primary Examiner* — Jason M Greene
*Assistant Examiner* — Anthony Shumate
(74) *Attorney, Agent, or Firm* — Parsons Behle & Latimer

(57) ABSTRACT

A gas separation module includes at least one inlet port, a plurality of outlet ports, and a plurality of hollow fiber membranes. Individual fibers have a feed end and a product end with a retentate interior side and a permeate exterior side. The module includes a feed tubesheet within the shell segregating the at least one inlet port and the permeate side of the fibers. The feed tubesheet includes a matrix and at least one segment joint. The segment joint separates segments of the feed tubesheet from one another. A formation method includes positioning a hollow fiber membrane material in association with at least one tubesheet segment joint and applying a matrix. The method includes forming a feed tubesheet from cured matrix and the segment joint and forming a plurality of hollow fiber membranes from the fiber material. The segment joint separates segments of the feed tubesheet from one another.

16 Claims, 8 Drawing Sheets

(56) References Cited

U.S. PATENT DOCUMENTS

| | | | |
|---|---|---|---|
| 4,220,535 A * | 9/1980 | Leonard | 210/321.89 |
| 4,276,249 A * | 6/1981 | Holladay | 264/139 |
| 4,369,605 A * | 1/1983 | Opersteny et al. | 451/38 |
| 4,686,039 A * | 8/1987 | Otstot et al. | 210/321.61 |
| 4,752,305 A * | 6/1988 | Johnson | 95/54 |
| 4,929,259 A * | 5/1990 | Caskey et al. | 210/321.89 |
| 4,955,993 A * | 9/1990 | Sanders et al. | 95/54 |
| 5,059,374 A * | 10/1991 | Krueger et al. | 264/156 |
| 5,202,023 A * | 4/1993 | Trimmer et al. | 210/321.8 |
| 5,211,728 A * | 5/1993 | Trimmer | 95/47 |
| 5,282,964 A * | 2/1994 | Young et al. | 210/321.8 |
| 5,380,433 A * | 1/1995 | Etienne et al. | 210/321.79 |
| 5,695,702 A * | 12/1997 | Niermeyer | 264/129 |
| 5,779,897 A * | 7/1998 | Kalthod et al. | 210/321.8 |
| 6,153,097 A * | 11/2000 | Jensvold et al. | 210/321.81 |
| 6,290,756 B1 * | 9/2001 | Macheras et al. | 96/8 |
| 6,331,248 B1 * | 12/2001 | Taniguchi et al. | 210/321.8 |
| 6,640,470 B2 * | 11/2003 | Chesner et al. | 37/317 |
| 6,755,894 B2 * | 6/2004 | Bikson et al. | 95/52 |
| 6,913,636 B2 | 7/2005 | Defrancesco et al. | |
| 7,081,153 B2 | 7/2006 | Leigh et al. | |
| 7,152,635 B2 | 12/2006 | Moravec et al. | |
| 7,204,868 B2 | 4/2007 | Snow, Jr. | |
| 7,517,388 B2 * | 4/2009 | Jensvold | 95/45 |
| 7,638,049 B2 * | 12/2009 | Sengupta et al. | 210/321.88 |
| 2002/0133983 A1 * | 9/2002 | Chesner et al. | 37/307 |
| 2004/0000233 A1 * | 1/2004 | Nichols et al. | 95/52 |
| 2010/0326278 A1 * | 12/2010 | Nakamura et al. | 96/8 |
| 2012/0074054 A1 * | 3/2012 | Burr et al. | 210/323.2 |
| 2012/0304856 A1 * | 12/2012 | Kanetsuki et al. | 95/47 |
| 2012/0312162 A1 * | 12/2012 | Theodore et al. | 95/47 |
| 2013/0075321 A1 * | 3/2013 | Hobbs et al. | 210/321.8 |
| 2014/0230649 A1 * | 8/2014 | Cao | B01D 53/22 95/47 |

OTHER PUBLICATIONS

"Compliance" The American Heritage Dictionary of the English Language, Fourth Edition copyright 2000 by Houghton Mifflin Company. Updated in 2009. Published by Houghton Mifflin Company.*
The international Bureau of WIPO; International Preliminary Report on Patentability for Application No. PCT/US2013/077205 dated Aug. 13, 2015, 7 pages.

* cited by examiner

GAS SEPARATION MODULES AND METHODS FOR FORMING

TECHNICAL FIELD

The present document pertains to methods for forming gas separation modules and gas separation modules, including modules in aircraft fuel tank flammability reduction systems.

BACKGROUND

Known air separation modules (ASMs) are found in aircraft fuel tank flammability reduction systems. The ASM removes some oxygen from air to generate nitrogen-enriched air (NEA), which then flows into fuel tank ullage, a region in the tank that often contains evaporated fuel (i.e., fuel vapor). The NEA may reduce flammability of the fuel tank ullage. Federal Aviation Administration (FAA) regulations require that new and in-service transport aircraft include systems for enhancing the safety of aircraft fuel tanks. Unfortunately, ASMs have a service life that may be limited by reduced separation efficiency or failure of components in the ASM, requiring repair or replacement and causing corresponding aircraft downtime. Accordingly, increased reliability of air separation modules is desirable.

SUMMARY

A gas separation module includes an external shell having at least one inlet port and a plurality of outlet ports and a plurality of hollow fiber membranes within the shell. Individual fibers have a feed end and a product end with a retentate interior side and a permeate exterior side between the feed end and the product end. The module includes a feed tubesheet within the shell securing the feed end of the fibers and segregating the at least one inlet port and the permeate side of the fibers. The feed tubesheet includes a matrix and at least one segment joint. The matrix encapsulates the feed end of the fibers. The segment joint contains a compliance material different from the matrix and separates a plurality of segments of the feed tubesheet from one another.

A gas separation module formation method includes positioning hollow fiber membrane material in association with at least one tubesheet segment joint and applying a matrix to the fiber material and to the segment joint and curing the matrix. The segment joint contains a compliance material different from the matrix. The method includes forming a feed tubesheet from the cured matrix and the segment joint and forming a plurality of hollow fiber membranes from the fiber material. Individual fibers have a feed end and a product end, the cured matrix encapsulates the feed end of the fibers, the feed tubesheet secures the feed end of the fibers, and the segment joint separates a plurality of segments of the feed tubesheet from one another.

The features, functions, and advantages that have been discussed can be achieved independently in various embodiments or may be combined in yet other embodiments further details of which can be seen with reference to the following description and drawings.

BRIEF DESCRIPTION OF THE DRAWINGS

The description below is made with reference to the following accompanying drawings.

DETAILED DESCRIPTION

Figure 1:
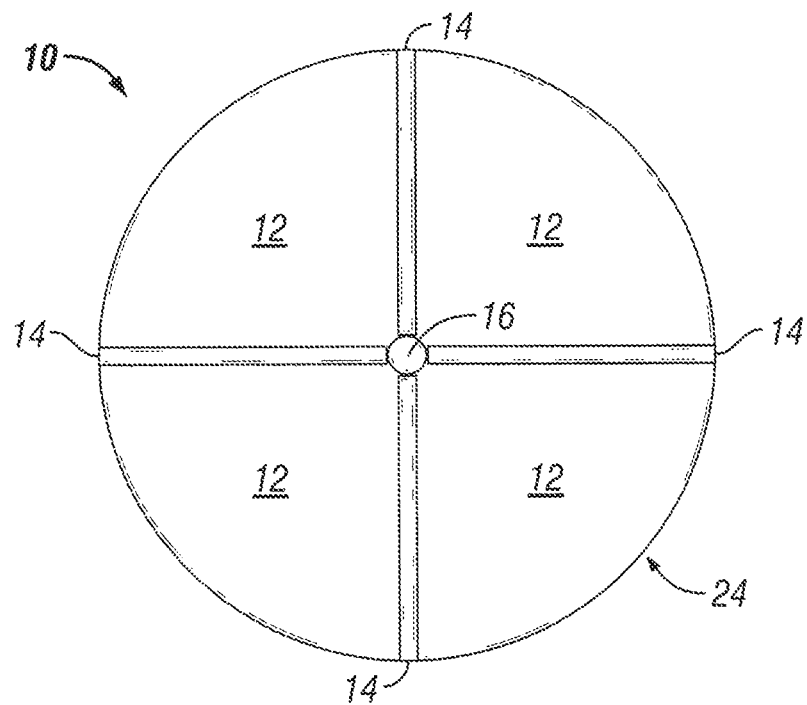
FIGS. 1, 2, and 5 are top, side, and sectional views, respectively, of an element for a gas separation module.

Some known gas separation modules use hollow fiber membranes (HFMs). Hollow fiber membranes may include a fiber wall of a permeable, porous material supporting a thin membrane thereon providing selectivity in the gas separation process. During operation of the gas separation module, gas feed enters a feed end of the fibers and selected gasses diffuse through fiber walls to produce permeate. Retained gasses proceed down the hollow fibers to the product end and exit as retentate. Both ends of the hollow fiber membranes may be potted with resin to secure the fibers. The potted resin securing the fiber ends forms tubesheets at each end that segregate the gas feed and the retentate from the permeate. The combination of the fibers and tubesheets forms an element that may be inserted in a shell to form the module. Some may be refer to the element as a "cartridge" and to the shell as a "canister." However, in the present document, the meaning of "element" and "shell" are not limited to the respective ordinary meanings of "cartridge" and "canister." Generally, the potted resin forms a plug with a circular perimeter around the respective fiber ends fitted within a tube-shaped shell. Even so, the configurations herein include additional geometries for tubesheets.

For some applications in which a gas separation module is used, such as a fuel tank flammability reduction system, gas feed may be supplied at an elevated temperature. For separation of oxygen from air, and for other gas pairs, separation efficiency may increase with increased temperature of gas feed. Beneficially, a readily available gas source might supply heated gas as a byproduct of an unrelated process. In aircraft, engine bleed air is a known source for gas feed to an air separation module and often reaches the air separation module at 160° F. to 300° F.

Tubesheet exposure to elevated temperatures may cause expansion in both radial and circumferential directions followed by contraction when the tubesheet later cools. An air separation module cycles on and off corresponding to the periods when inert gas is supplied to fuel tank ullage and when it is not. Due to the circular perimeter and being fitted within a tube-shaped shell, tubesheet expansion in the circumferential direction may be limited. Restriction of circumferential expansion may produce stress within tubesheet materials, including both the resin and hollow fibers.

Also, physical aging may cause the resin to shrink or to become brittle over time or both. Consequently, as a result of the physical aging, tensile strength of the resin may decrease and it may become prone to cracking, allowing gas feed leaks into permeate. Thermal aging may accelerate the physical aging as a result of heat exposure. The expansions or contractions or both mentioned above then become more likely to produce cracking.

That is, the shrinking of the resin in the radial direction following thermal expansion may create a tension load in the radial direction. Fibers are often formed in concentric layers of increasing diameter from the center of the tubesheet. Once the tensile stress in the radial direction exceeds bond strength between the resin and the fibers, tubesheet cracks between fiber layers or in other locations may initiate. Often, resin materials are selected to withstand such stresses with sufficient bond strength. However, reduced bond strength as a result of thermal aging may allow cracks to initiate and then propagate between fiber layers. In addition to cracks separating resin from fibers, cracking may separate the thin membrane of a fiber wall from the underlying porous material supporting it.

Cracking may be reduced by operating a gas separation module at a lower temperature to delay thermal aging effects. Unfortunately, reduced temperature may reduce separation efficiency in the gas separation module. With reduced efficiency, a larger gas separation module would be used to produce a comparable flow rate of separated gas. A larger gas separation module weighs more than a smaller module of the same construction and may be a disadvantage in some applications, such as in aerospace.

Another possibility includes accepting a reduced life cycle of a gas separation module that accompanies use at elevated temperatures and adjusting maintenance cycles to allow repair or replacement more frequently. Nevertheless, the increased cost associated with reduced life cycle might not be acceptable.

Configurations described herein allow a tubesheet to withstand stresses associated with thermal expansion and contraction and to resist cracking. Tubesheets may be designed to allow operation at the temperature capability of the potting resin with decreased risk of tubesheet cracking. The increased operating temperature allows increased separation efficiency and decreased module size and weight. Commercial aircraft using a gas separation module in a fuel tank flammability reduction system may especially benefit from reduced module size and weight.

Although apparatuses and methods herein provide benefits significant for aerospace, they might be used in other applications of hollow fiber membrane gas separation technology. Examples include separation of methane/nitrogen/carbon dioxide, such as in oil fields, separation of selected components of flue gas, such as in oil- or gas-fired power plants, chemical gas purifications, gas dehydration, etc. Likewise, configurations might be used on various types of aircraft, both commercial and military, including fighter jets and helicopters. Many possible applications exist for a fuel tank inerting system in which configurations herein may be used.

Configurations herein include using at least one segment joint in a tubesheet. The segment joint may contain a compliance material and separate segments of the tubesheet from one another. Accordingly, the segments may expand and contract due to cyclic operating temperatures without tubesheet cracking since the segment joint may compress to allow tubesheet expansion in the circumferential direction. Such a segmented tubesheet design might accommodate circular, rectangular, and other tubesheet perimeter shapes.

A gas separation module includes an external shell having at least one inlet port and a plurality of outlet ports and a plurality of hollow fiber membranes within the shell. Individual fibers have a feed end and a product end with a retentate interior side and a permeate exterior side between the feed end and the product end. The module includes a feed tubesheet within the shell securing the feed end of the fibers and segregating the at least one inlet port and the permeate side of the fibers. The feed tubesheet includes a matrix and at least one segment joint. The matrix encapsulates the feed end of the fibers. The segment joint contains a compliance material different from the matrix and separates a plurality of segments of the feed tubesheet from one another. The matrix may include the resin described above or adhesive or both. Examples include resin and adhesive containing epoxy, bismaleimide, cyanate ester, or benzoxazine components and exhibiting a viscosity of less than 10 poises at a temperature used for infusion of the potted matrix.

Figure 2:
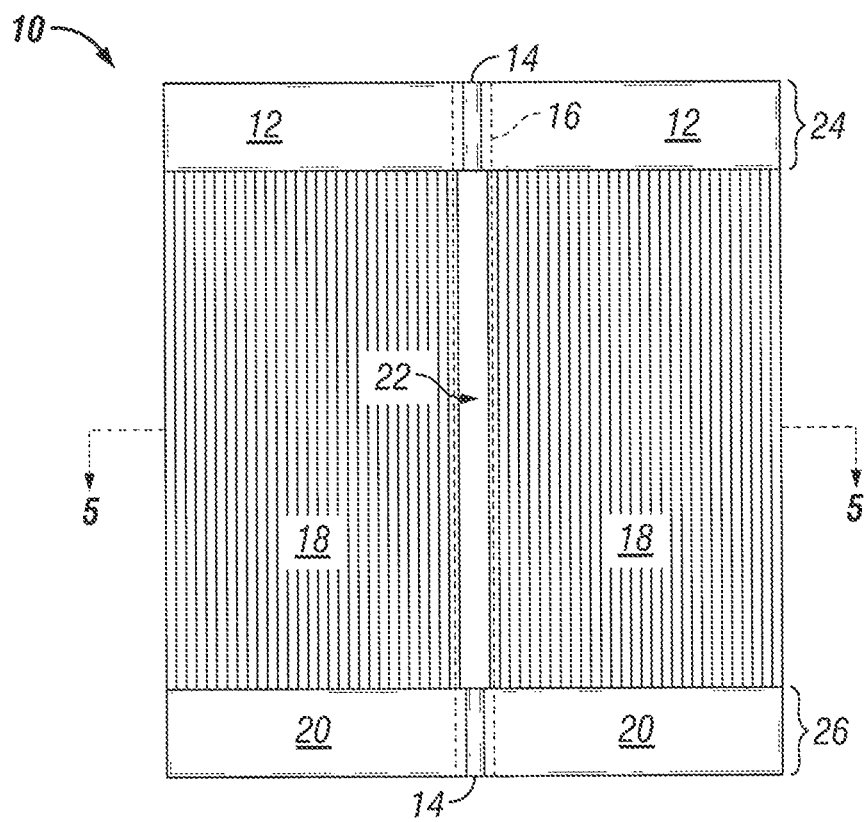
Figure 5:
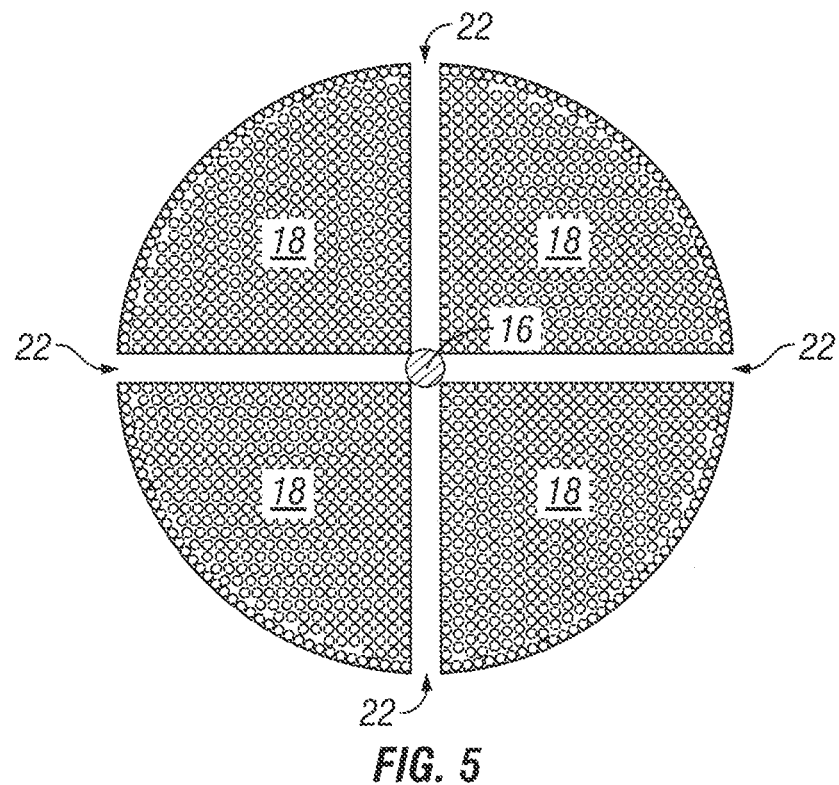

FIGS. 1, 2, and 5 show an element 10 suitable for use in a gas separation module. Element 10 includes a tubesheet 24 at one end of fibers 18. Tubesheet 24 includes a plurality of segments 12 separated from one another by segment joints 14. A support 16 supports the structure of element 10, retaining it in the cylindrical shape shown in FIGS. 1, 2 and 5. When segment joints 14 include a compliance material, tubesheet 24 may be configured to allow expansion and contraction of segments 12 in a circumferential direction in the top view of element 10 shown in FIG. 1.

In FIG. 2, a further tubesheet 26 is shown at another end of fibers 18. Segment joints 14 are included in tubesheet 26 in the same manner as shown in the top view of FIG. 1. However, as may be appreciated from the discussion below, a different configuration of segment joints may exist in one tubesheet compared to another tubesheet. For example, since a feed tubesheet might be exposed to greater temperatures, a product tubesheet at an opposite end of fibers might not contain any segment joints or might have fewer segment joints or a different arrangement of segment joints or both in contemplation of less thermal exposure. Similarly, the product tubesheet may contain a matrix different from the matrix of the feed tubesheet given potentially different temperature exposure. However, a symmetrical design is often easier to fabricate and the feed and product tubesheets may be the same in many or in all respects. Segment joints 14 in tubesheet 26 divide tubesheet 26 into four segments 20 in the same manner as shown in the top view of FIG. 1.

The side view of FIG. 2 and the sectional view of FIG. 5 taken along line 5-5 shown in FIG. 2 show an idealistic arrangement of fibers 18 between tubesheet 24 and tubesheet 26. Since segment joints 14 are provided within tubesheet 24 and tubesheet 26, they do not extend between tubesheet 24 and tubesheet 26. Such placement accommodates efficient methods for forming element 10, as appreciated from the description below. Notably, gaps 22 between fibers 18 are apparent in FIGS. 2 and 5. In element 10, the placement of segment joints 14 in tubesheet 24 and tubesheet 26 produces gaps 22 since the ends of fibers 18 are secured in the matrix comprised by tubesheet 24 and tubesheet 26. In practice though, fibers 18 may be somewhat flexible and may reorient, shift, swell, or otherwise distribute naturally to at least partially occupy gaps 22, even though the matrix secures the ends of fibers 18.

Figure 3:
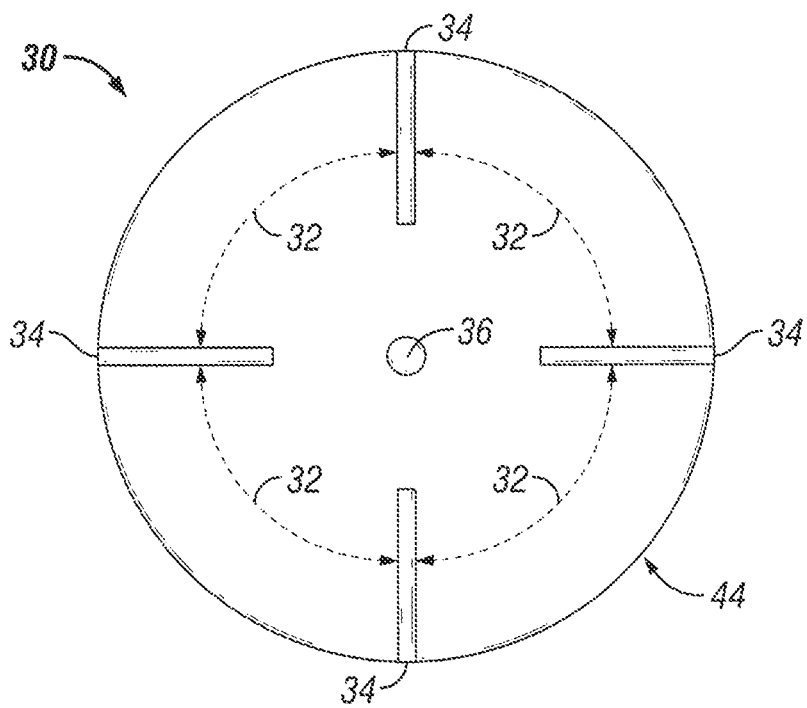
FIGS. 3, 4, and 6 are top, side, and sectional views, respectively, of another element for a gas separation module.
Figure 4:
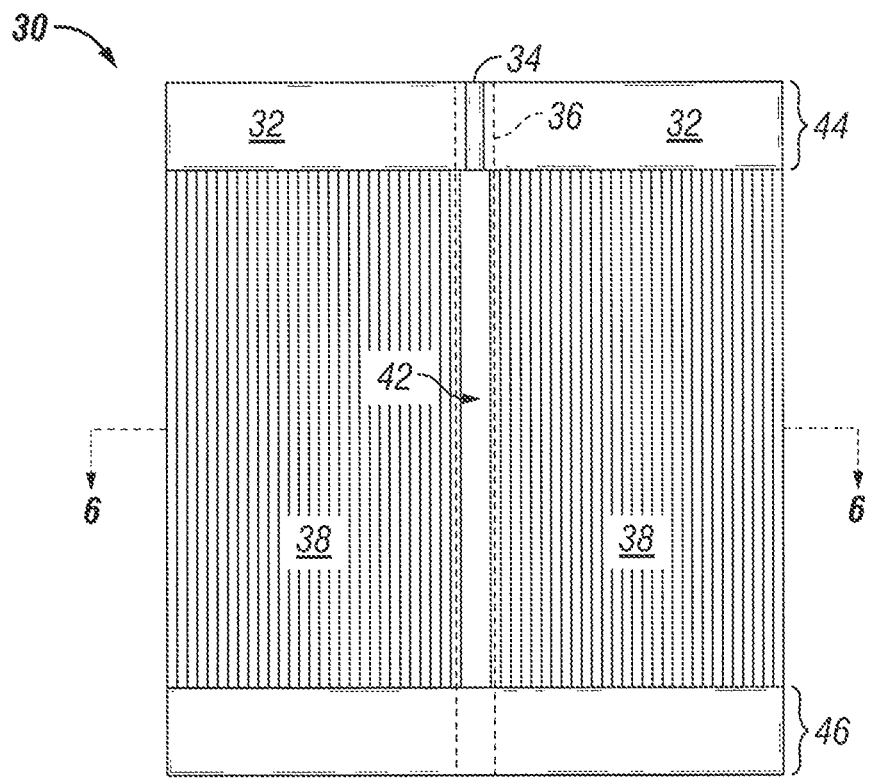
Figure 6:
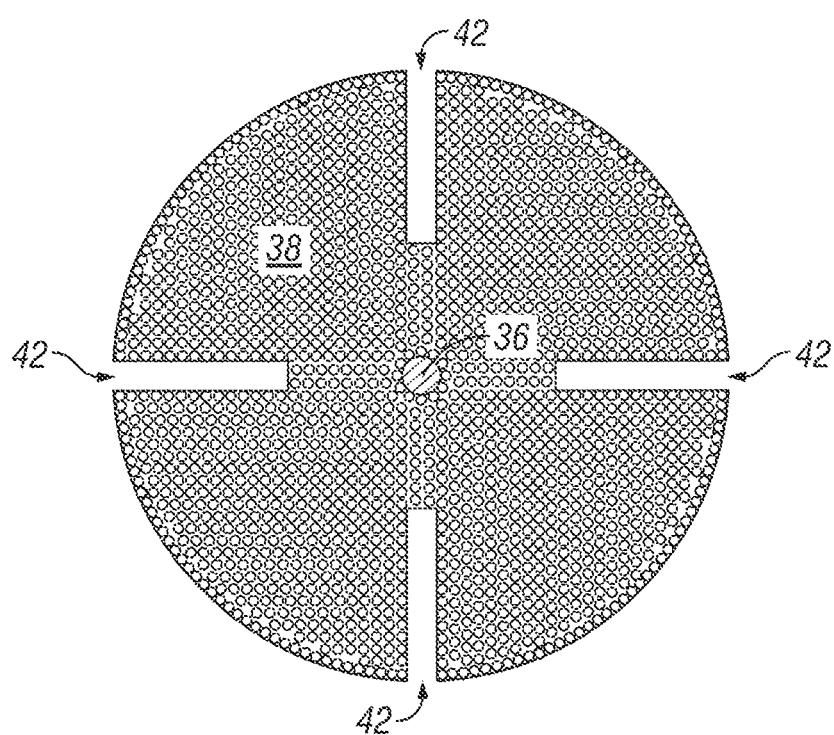

FIGS. 3, 4, and 6 show an element 30 with an alternative configuration providing at least one segment joint separating a plurality of segments of a feed tubesheet from one another.

A tubesheet 44 at one end of fibers 38 includes a plurality of segment joints 34 separating segments 32 of tubesheet 44 from one another. Even though all of tubesheet 44 is continuous, it nonetheless includes portions that are separated from one another identified as segments 32. Continuous tubesheet 44, having four segments 32 elsewhere connected by portions of tubesheet 44, may be contrasted with discontinuous tubesheet 24 (FIGS. 1 and 2), having four discontinuous segments 12 (FIGS. 1 and 2). A support 36 provides structure to the cylindrical shape of element 30 shown in FIGS. 3, 4, and 6.

FIG. 4 shows a side view of element 30, which further includes tubesheet 46. Ends of fibers 38 are secured within tubesheet 44 and tubesheet 46. Tubesheet 46 does not contain any segment joints and may be characterized as a continuous tubesheet lacking any segments separated from one another by a segment joint containing a compliance material. Support 36 centrally located in tubesheet 46 (as in tubesheet 44) separates opposing segments of tubesheet 46 on opposing sides of support 36. However, support 36 extends between tubesheet 44 and tubesheet 46. Segment joints 34 do not extend between tubesheet 44 and tubesheet 46. Also, support 36 is rigid and does not contain a compliance material to accommodate any expansion or contraction. Accordingly, support 36 is not properly characterized as a segment joint.

Segment joints 34 may allow contraction or expansion or both in the circumferential direction within tubesheet 44. It will appreciated in the top view of FIG. 1 that a greater distance exists between segment joints 14 at the perimeter of tubesheet 24 in comparison to regions of tubesheet 24 closer to the center at support 16. Since more material of tubesheet 24 exists between segment joints 14 at the perimeter, a greater need exists at the perimeter for accommodating expansion.

It follows that segment joints 34 in FIG. 3 extending only partway from the perimeter to the center of tubesheet 44 at support 36 may still accommodate circumferential expansion. While the segregated and discontinuous segments 12 of tubesheet 24 (FIGS. 1 and 2) accommodate more expansion, tubesheet 44 may nonetheless be adequate in some circumstances, depending on the operating conditions or extent of expansion or both. As described below, some differences exist in manufacturing techniques for element 10 (FIGS. 1 and 2) compared to element 30 (FIGS. 3 and 4). Some manufacturing benefits exist for element 10 as a result of the structure shown for segment joints 14.

Allowance is made for dimensions and configurations of segment joints and tubesheet segments to be sized appropriately. That is, designs may accommodate the expansion and contraction from thermal cycles and shrinkage from physical/thermal aging that may vary among applications. For example, the number of segment joints in a circular tube sheet may vary depending on the diameter of the tubesheet. Four to eight segments may be suitable. The segment joint thickness may depend on physical properties of the compliance material used, such as elastic modulus and ductility under expected operating conditions. In the case of commercial aircraft, modulus and ductility may be considered within a wide range of temperature from about −40° F. to about 300° F. to cover low temperatures experienced at altitude and high temperatures experienced from engine bleed air feed.

FIG. 6 shows a sectional view of element 30 shown in FIG. 4 taken along line 6-6. Gaps 42 are apparent in element 30 extending between tubesheet 44 and tubesheet 46 as discussed with regard to gaps 22 (FIGS. 2 and 5). In practice, fibers 38 may distribute to at least partially fill gaps 42, as discussed above for gaps 22. Segment joints 34 (FIGS. 3 and 4) are provided within tubesheet 44 and tubesheet 46 and do not extend therebetween.

Figure 7:
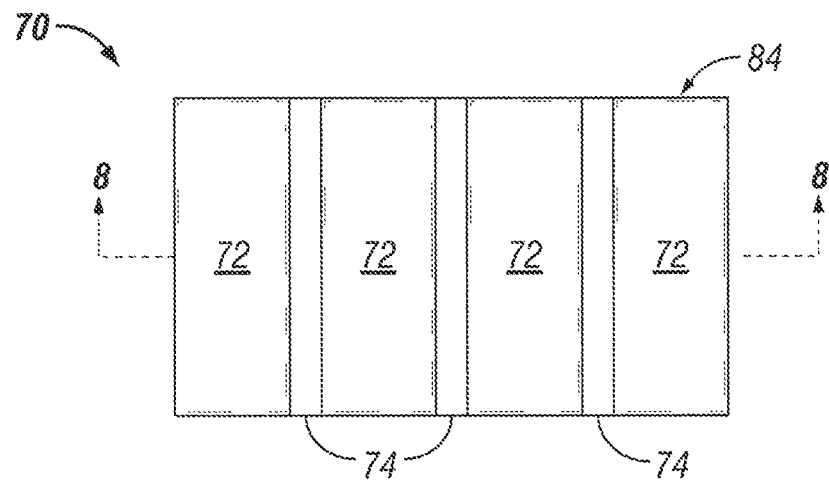
FIGS. 7 and 8 are top and side views, respectively, of a further element for a gas separation module.
Figure 8:
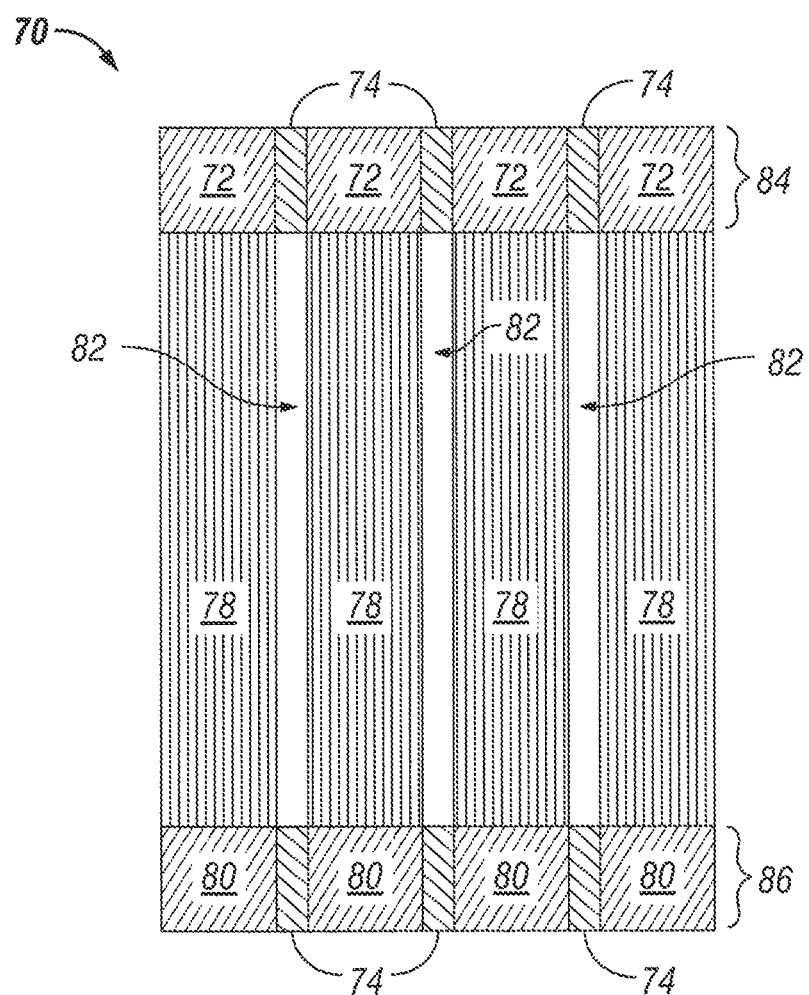

FIGS. 7 and 8 show an element 70 including a tubesheet 84 having a plurality of segments 72 separated from one another by segment joints 74. Notably, tubesheet 84 shown in FIG. 7 has a rectangular perimeter in comparison to circular tubesheet 24 shown in FIG. 1. The rectangular perimeter may be a square rectangle. It will be appreciated that a compliance material in segment joints 74 allows expansion and contraction of segments 72 in a manner similar to that discussed above for tubesheet 24 (FIGS. 1 and 2). The sectional view of element 70 taken along line 8-8 shown in FIG. 8 shows ends of fibers 78 secured by tubesheet 84 and a tubesheet 86. Fibers 78 are arranged in a bundle for each segment 72. Each bundle has a segment 72 with a rectangular perimeter at the fiber ends. Tubesheet 86 includes segments 80 also separated from one another by segment joints 74.

Gaps 82 exist between fibers 78 extending from tubesheet 84 to tubesheet 86. In practice, fibers 78 may distribute to at least partially fill gaps 82, as discussed above for gaps 22 (FIGS. 2 and 5). Segment joints 74 are provided within tubesheet 84 and tubesheet 86 and do not extend therebetween.

FIGS. 7 and 8 do not show any support for element 70 as shown for element 10 and element 30 regarding respective support 16 (FIGS. 1, 2, and 5) and support 36 (FIGS. 3, 4, and 6). Even so, element 70 may include a support or multiple supports positioned as appropriate to maintain structural integrity of element 70. Alternatively, it is conceivable that any of elements 10, 30, and 70 may be formed without a support when the method of formation, selection of materials, module shell, or combinations thereof accommodate lack of a support with appropriate design features.

Figure 9:
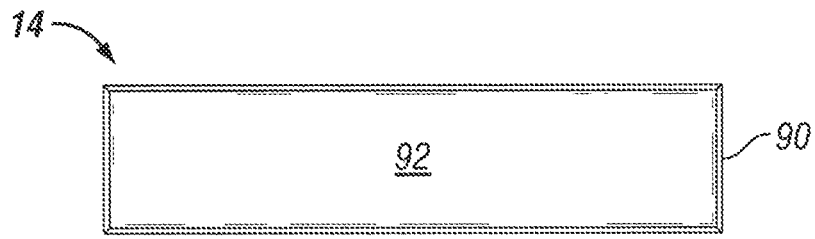
FIG. 9 is a cross-sectional view of a segment joint for a gas separation element and FIG. 10 is an exploded view of the same.
Figure 10:
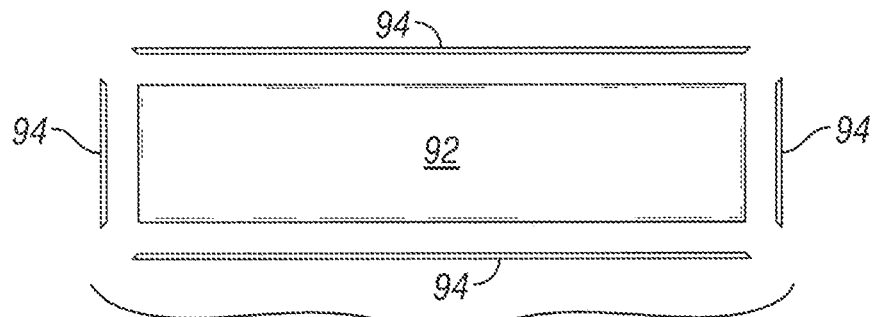

FIG. 9 shows a segment joint 14 in cross-sectional view including a compliance material 92 and a facesheet 90 configured to seal compliance material 92 from the matrix of a tubesheet. Facesheet 90 may protect the matrix from the outgassing of contaminants from compliance material 92. Facesheet 90 may also protect compliance material 92 from matrix flowing into porous portions thereof. The exploded view of segment joint 14 in FIG. 10 shows that facesheet 90 may include several facesheet portions 94 assembled to seal compliance material 92. Instead, facesheet 90 may include a continuous coating. Compliance material 92 may contain low density polymeric foams, metal foams, elastomeric materials, and combinations thereof.

An example of low density foam includes polyimide foam having a density of less than 15 pounds per cubic foot ($lb/ft^3$), such as 8-15 $lb/ft^3$. An example of metal foam includes aluminum foam. An example of elastomeric material includes silicone rubber. Compliance material 92 may have a thickness of 0.25 to 0.375 inches to accommodate segment expansion. However, compliance material thickness dimensions may vary among applications. More generally, compliance material thickness could be 2-5% of segment thickness in the rectangular tubesheet.

Facesheet 90 may include a carbon composite material or an aluminum sheet or both and may have a thickness of 0.005 to 0.015 inches. Facesheet 90 may provide structural strength in the axial direction of the tubesheet, but flex in the circumferential direction of the tubesheet to accommodate the expansion and contraction of the tubesheet materials.

Figure 11:
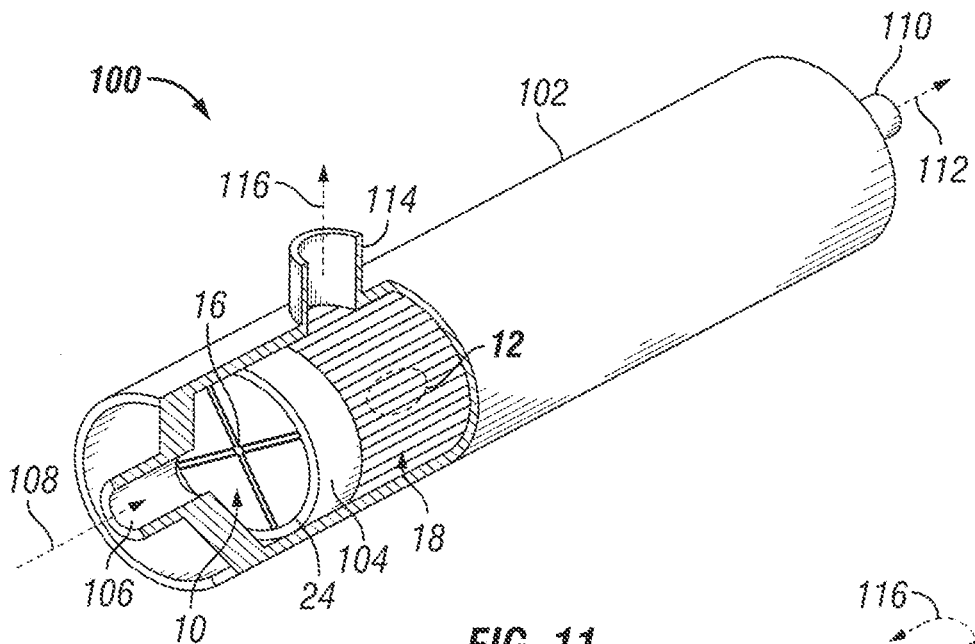
FIGS. 11 and 12 are isometric and close-up views, respectively, of a gas separation module.
Figure 12:
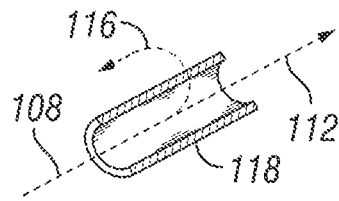

FIGS. 11 and 12 show a gas separation module 100 including a shell 102 in which element 10 is installed. An inlet port 106 allows entry of a feed gas 108 to contact tubesheet 24 and enter fibers 18. Although not shown in FIGS. 1, 3, 7, and 11 for simplicity, it is to be understood that the ends of the fibers are open at the ends of the tubesheets to allow gas flow through the fibers. Consequently, feed gas 108 flows into an individual fiber 118 (shown in FIG. 12) to produce permeate 116, which passes through the wall of individual fiber 118. Retentate 112 exits individual fiber 118 at tubesheet 26 (not shown in FIG. 11) and flows through an outlet port 110. Permeate 116 from each of fibers 18 collects between tubesheet 24 and tubesheet 26 and flows through outlet port 114.

A rim 104 around tubesheet 24 is provided to seal tubesheet 24 within shell 102. Element 10 may be removed from shell 102 and replaced as needed. Alternatively, rim 104 may be affixed to shell 102 and the assembly containing shell 102 and element 10 may be removed and replaced as needed. In such case, element 10 might be formed without support 16 when element 10 is affixed to shell 102 such that shell 102 functions as a support.

Accordingly, by way of example, the gas separation module may be an air separation module comprised by an aircraft fuel tank flammability reduction system. The system may further include a source for air to the at least one inlet port and a fuel tank on board the aircraft to receive retentate, which contains nitrogen-enriched air.

Figure 13:
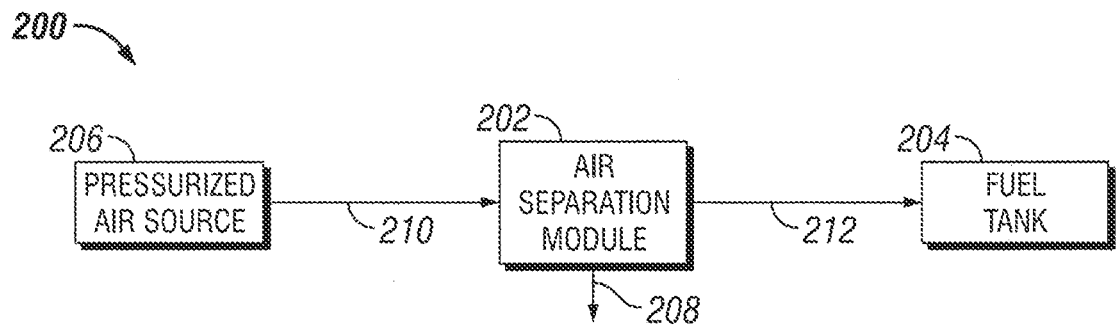
FIG. 13 shows a fuel tank flammability reduction system.

FIG. 13 shows a system 200 with an ASM 202 that may include the gas separation modules described herein. An air source 206 may be pressurized, as shown in FIG. 13. Separation efficiency often increases with increasing differential pressure across a separation medium, as in the case of hollow fiber membrane production of nitrogen-enriched air. Air source 206 provides air feed 210 to ASM 202, which produces permeate 208 and nitrogen-enriched air 212. A fuel tank 204 is configured to receive nitrogen-enriched air 212 to reduce flammability of fuel tank ullage.

Accordingly, the plurality of outlet ports may include at least one outlet port to exhaust retentate from the product end of the fibers. The module may further include a product tubesheet within the shell securing the product end of the fibers and segregating the permeate side of the fibers and the at least one outlet port. The product tubesheet may include a matrix and at least one segment joint, the matrix encapsulating the product end of the fibers. The segment joint may contain a compliance material different from the matrix and separate a plurality of segments of the product tubesheet from one another. The segment joint in the feed tubesheet may be separate from the segment joint in the product tubesheet. The respective segment joints in the feed and product tubesheets might not extend between the feed and product tubesheets.

The feed tubesheet may exhibit a rectangular perimeter around the feed end of the fibers. Correspondingly, the fibers may be arranged in one or more bundles, individual bundles having a segment of a tubesheet with a rectangular perimeter at the feed end and a segment of a tubesheet with a rectangular perimeter at the product end. The at least one segment joint may include a facesheet sealing the compliance material from the matrix. Additionally, the facesheet may have a treated surface enhancing bonding with the matrix. The feed tubesheet may further include a thermoplastic veil between layers of the hollow fiber membranes, the thermoplastic veil containing a material different from the matrix and increasing toughness of the feed tubesheet. The thermoplastic veil may be used in a tubesheet with a rectangular, circular, or other shape for its perimeter.

A gas separation module includes an external shell having at least one inlet port and a plurality of outlet ports. A plurality of hollow fiber membranes are within the shell, individual fibers having a feed end and a product end with a retentate interior side and a permeate exterior side between the feed end and the product end. A feed tubesheet is within the shell securing the feed end of the fibers and segregating the at least one inlet port and the permeate side of the fibers. The feed tubesheet includes a matrix and a plurality of segment joints. The matrix contains an adhesive or a resin or both, the matrix encapsulating the feed end of the fibers. The segment joints contain a compliance material different from the matrix and separating a plurality of segments of the feed tubesheet from one another. A plurality of facesheets seal respective segment joints from the matrix. The module includes a rim containing the matrix around the feed tubesheet.

By way of example, the gas separation module may be an air separation module comprised by an aircraft fuel tank flammability reduction system. Also, the feed tubesheet may exhibit a rectangular perimeter around the feed end of the fibers. The feed tubesheet may contain four to eight segment joints. The matrix may further include nano-silica particles, which may range in size from 50 to 150 nanometers. A volume fraction of the nano-silica particles in the matrix may be less than or equal to 40%, such as 10-40%. Other particles, such as bucky ball carbon nanoparticles, may be used.

Nanoparticles may have a coefficient of thermal expansion (CTE) less than other matrix materials to reduce the overall cure shrinkage and CTE of the tubesheet. As much as 50% reduction in CTE for the composite tubesheet has been determined. The nanoparticles' surfaces may be functionalized with chemical moieties to react with surrounding matrix, such as resin, and to resist cracking along the resin/nanoparticle interface. If more than a 40% volume fraction of nano-silica is used, observation indicates that lumps may form and yield a heterogeneous matrix material when attempting to mix the components. Added nanoparticles may also increase viscosity and limit infusion of matrix into layers of fibers.

The facesheets may include a treated surface enhancing bonding with the matrix. The rim may further include carbon fibers or nano-silica particles or both structurally reinforcing the rim. Such a reinforced rim may assist with mechanical fastening to other components, including the external shell, and provide a reliable sealing surface to interface with the shell. Carbon fiber may exhibit a near zero CTE and nano-silica particles may exhibit a CTE less than the resin in the rim. As one possibility, carbon fibers for the rim may be wound circumferentially around the tubesheet or fiber membrane material or both to maintain radial compression more effectively. The feed tubesheet may further include a thermoplastic veil between layers of the hollow fiber membranes, the thermoplastic veil containing a material different from the matrix and increasing toughness of the feed tubesheet. The features described above for the feed tubesheet may also be used in the product tubesheet as applicable.

Figure 14:
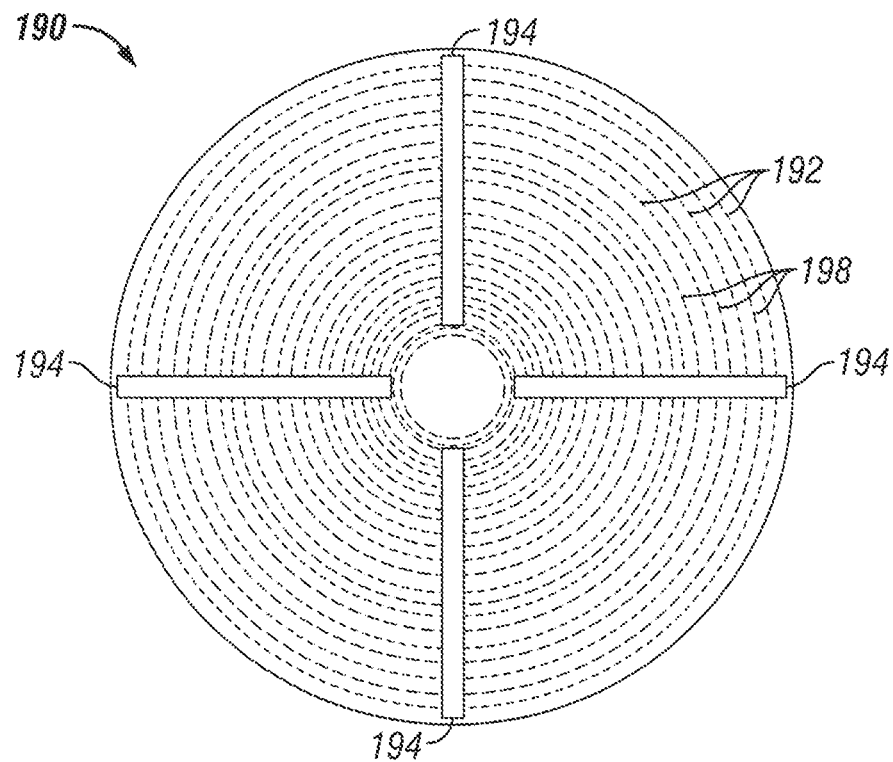
FIG. 14 is a top view of an element for a gas separation module with a veil between fiber layers.

FIG. 14 shows a top view of one example of an element similar to that shown in FIG. 1. An element 190 includes a veil 192 between layers of fibers 198 and segment joints 194 in association with ends of fibers 198. Alternating veils 192 and layers of fibers 198 extend toward the center of element 190. Matrix (not shown) between veils may encapsulate and secure fiber ends in each layer of fibers 198 and bond to segment joints 194 to segregate gas feed from a permeate side of fibers 198. Element 190 is shown without a support, such as support 16 of FIG. 1.

Veil materials may be thermoplastic and may be functionalized with a chemical moiety bonding with a matrix material. The glass transition temperature of the veil may be at least 100° F., such as 100-150° F., above the designed operational temperature of the gas separation module. Glass transition temperature marks a transition between a rigid solid and a supercooled liquid. Areal weight of the veil may be 0.006-0.015 grams per square meter (g/m$^2$), such as 0.01-0.010 g/m$^2$, and the thickness may be 50-100 micrometers. Areal weight indicates the mass per unit area of the veil material.

A gas separation module formation method includes positioning hollow fiber membrane material in association with at least one tubesheet segment joint and applying a matrix to the fiber material and to the segment joint and curing the matrix. The segment joint contains a compliance material different from the matrix. The method includes forming a feed tubesheet from the cured matrix and the segment joint and forming a plurality of hollow fiber membranes from the fiber material. Individual fibers have a feed end and a product end, the cured matrix encapsulates the feed end of the fibers, the feed tubesheet secures the feed end of the fibers, and the segment joint separates a plurality of segments of the feed tubesheet from one another.

By way of example, the method may further include applying additional matrix to the fiber material and to at least one other segment joint and curing the additional matrix. The other segment joint may contain a compliance material different from the additional matrix. A product tubesheet may be formed from the additional cured matrix and the other tubesheet segment joint, the additional cured matrix encapsulating the product end of the fibers, the product tubesheet securing the product end of the fibers, and the other segment joint separating a plurality of segments of the product tubesheet from one another.

Applying the matrix may include applying a matrix film or a liquid resin. The matrix film may be an adhesive film or a resin film or a combination thereof. Use of liquid resin may occur, for example, when known techniques for potting fiber ends are combined with the configurations herein. As such, segment joints are bound together with fiber ends and liquid resin applied to infuse between fibers. Adhesive film may be used in combination with or as an alternative to resin film.

Use of adhesive film or resin film or both may occur, for example, in the configurations herein described in more detail below. A thermoplastic veil may be applied between layers of the hollow fiber membranes, the thermoplastic veil containing a material different from the matrix and increasing toughness of the feed tubesheet. Prior to applying the veil, the method may include preparing a veil assembly by mounting a matrix film as the matrix on the veil. Instead, or in addition, liquid resin may be used in potting fiber ends.

The segment joint may be attached to a support and positioning the fiber material may include winding the fiber material onto the support. Known techniques for winding fiber material onto a support, including spiral and diagonal winding, may be used with accommodation for the segment joint attached thereto. An example of a fiber material includes a continuous strand of hollow fiber membrane. Forming the feed tubesheet and forming the plurality of hollow fiber membranes may include machining the cured matrix and the fiber material and opening the feed end of the fibers. Opening the feed end of the fibers may include severing and removing excess fiber material to open the fibers at the ends of the tubesheets.

As an alternative to attaching the segment joint to the support, positioning the fiber material in association with at least one tubesheet segment joint may include machining slots in the cured matrix and inserting the segment joint in the slot in association with fiber material. The matrix, whether a matrix film, liquid resin, or other material may contain nano-silica particles.

Whether or not a veil is used in conjunction with adhesive film or resin film or both, an infusion process may allow greater selection of tougher resin matrix to pot the tubesheet and thus reduce tubesheet cracking. Liquid resins suitable for use at a room temperature for infusion to pot the tubesheet often become brittle and prone to cracking. Suitable adhesive films and resin films may have less crosslink density and much higher viscosity at room temperature. Nevertheless, the viscosity may drop to less than 10 poise, such as 2-10 poise, at an infusion temperature before gelling occurs, followed by curing into the final tubesheet matrix at a curing temperature higher than the gelling temperature. The operational window in which the film stays at a viscosity less than 10 poise sufficient for infusing between the fibers may be controlled by formulations. Consequently, a film composition may be designed to allow infusion between fibers for up to two hours during curing. Toughening phases can also be formulated in the resin film to increase toughness of the resin film.

Use of a veil itself may function to increase tubesheet toughness. As an interlayer between layers of hollow fiber membranes, a veil may constitute a toughening phase for surrounding brittle resin to resist crack initiation and propagation along the interfaces between layers of hollow fiber membranes. Such may be the case whether liquid or film matrix materials are used. The veil as a fiber interlayer may also better define the spacing between the fiber layers for more uniform matrix distribution before curing or during infusion or both.

A gas separation module formation method includes positioning hollow fiber membrane material in association with at least one tubesheet segment joint and applying a matrix to the fiber material and to the segment joint. The matrix contains an adhesive or a resin or both and the segment joint contains a compliance material different from the matrix. The method includes placing the segment joint, a portion of the fiber material, and the matrix in a mold and applying pressure to the fiber material and the segment joint in a radial direction. While applying the pressure and additionally applying heat, the matrix is cured in the mold. The cured matrix and the fiber material are machined. The method includes forming a feed tubesheet from the machined, cured matrix and the segment joint and forming a plurality of hollow fiber membranes from the fiber material, individual fibers having a feed end and a product end. The feed end of the fibers are opened, the cured matrix encapsulating the feed end of the fibers, the feed tubesheet securing the feed end of the fibers, and the segment joint separating a plurality of segments of the feed tubesheet from one another. The method includes forming a rim containing the matrix around the feed tubesheet.

By way of example, features of other methods herein may be utilized in the present method. Also, the method may further include mounting a resin film as the matrix on a thermoplastic veil and applying the thermoplastic veil and resin film between layers of the hollow fiber membranes. The thermoplastic veil may contain a material different from the matrix and increase toughness of the feed tubesheet. Positioning the fiber material may include winding the fiber material onto a cylindrical support and the feed tubesheet may have a circular perimeter. Instead, positioning the fiber material may include winding the fiber material onto a support including a column with a rectangular cross-section and the feed tubesheet may have a rectangular perimeter. Forming the feed tubesheet may include stacking a plurality of segments of a feed tubesheet, each segment having a rectangular perimeter, with the segment joint between the plurality of segments.

Figure 15:
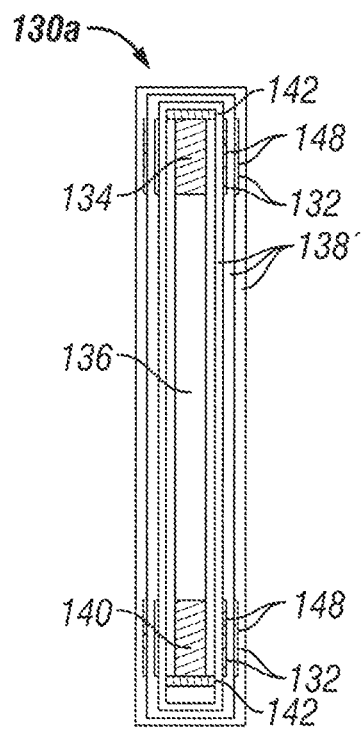
FIG. 15 is a cross-sectional view of a hollow fiber membrane material wound onto a segment joint and a support along with a matrix film and FIG. 16 is a side view at a stage subsequent to that shown in FIG. 15 after curing and machining to open the fiber ends.
Figure 16:
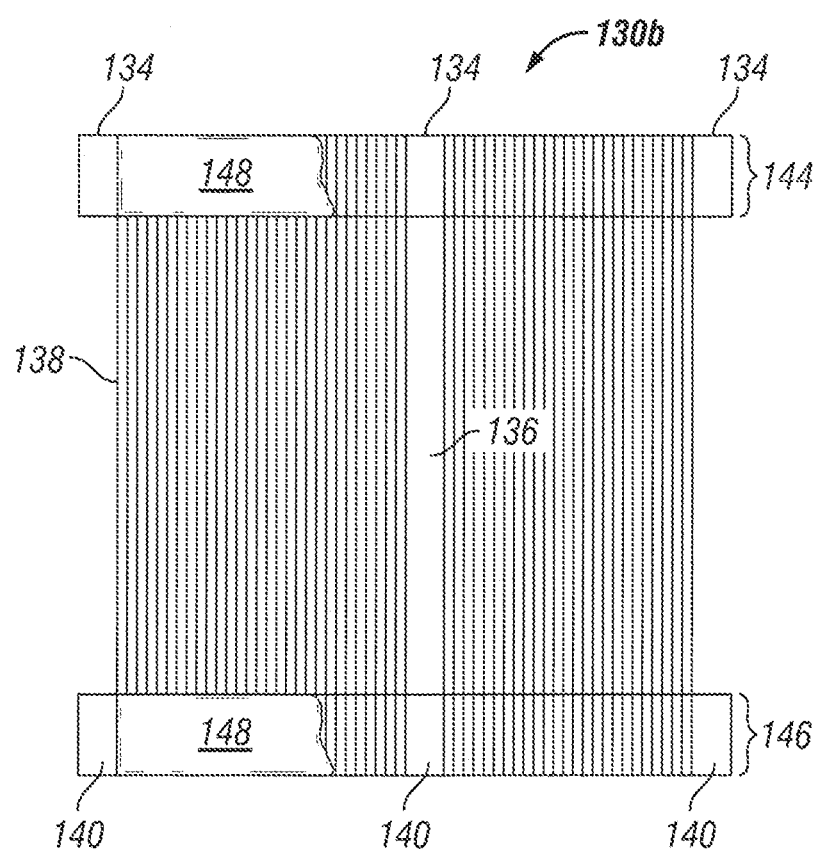

FIG. 15 shows a cross-sectional view of a gas separation element 130a during assembly. Fiber material 138' is wound onto a support 136, segment joint 134, and segment joint 140. Segment joints 134 and 140 are arranged as shown in FIG. 16 attached to support 136. Stand-off shims 142 have a sufficient thickness to place segment joints 134 and 140 in a winding apparatus (not shown) at a desired position. Matrix film 148 is supported by veils 132 (too thin to show in detail) and is applied to ends of fibers (see FIG. 16).

FIG. 16 shows a side view of element 130*a* at a subsequent stage after curing matrix film 148 and machining to open the ends of fibers 138 and to form tubesheet 144 and tubesheet 146 of element 130*b*. Matrix film 148 is shown partially cut away from tubesheet 144 and tubesheet 146 to reveal a layer of fibers 138 underneath. Fibers 138 are arranged in a rectangular bundle and veil 132 (FIG. 15) provides a tubesheet interlayer between layers of fibers 138, in similar fashion to that shown in FIG. 14 for a tubesheet with a circular perimeter. After curing, an element according to the descriptions herein may be formed. Although support 136 is shown included in element 130*a* and 130*b*, it is conceivable that the element could be formed without support 136 using known techniques.

Figure 17:
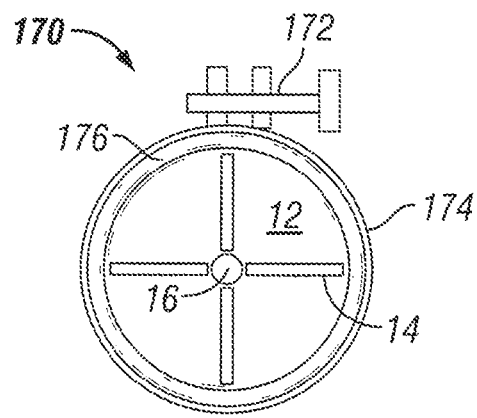
FIG. 17 is a top view of a clamp for a cylindrical gas separation element to apply radial pressure on a tubesheet during a matrix application process.

FIG. 17 shows a top view of a mold 170 including a clamp 172 securing a ring 174 in which segments 12, segment joint 14, and support 16 are placed. An expansion liner 176 allows for a compressive mold to provide radial pressure on a circular tubesheet during a cure cycle. Expansion liner 176 may contain silicone or a pneumatic silicone bladder. In addition to the radial pressure applied by clamp 172 and ring 174, silicone of expansion liner 176 that expands during a cure cycle may apply additional radial pressure. Similarly a pneumatic silicon bladder may be provided with increasing pressure during a cure cycle to increase radial pressure on the tubesheet. Expansion liner 176 may have a thickness that is from about 5% to about 6% of the diameter of the tubesheet fitted therein and a material to withstand curing temperatures.

Figure 18:
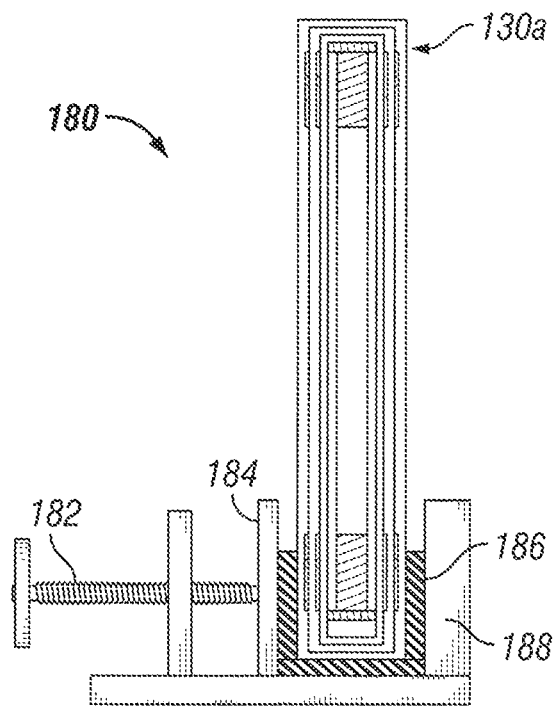
FIG. 18 is a side view of a clamp for a rectangular gas separation element shown in cross-sectional view to apply transverse pressure on a tubesheet during a matrix application process.

FIG. 18 shows a side view of a mold 180 including a clamp 182 securing a moveable wall 184 against a fixed wall 188 between which uncured rectangular element 130*a* is placed. An expansion liner 186 allows for a compressive mold to provide transverse pressure across the axial direction of the fibers in the element during a cure cycle. Expansion liner 186 may be as described for expansion liner 176.

The described compressive mold assists in overcoming fiber shifting during potting processes or in consolidation or infusion of matrix with fibers, whether liquid or film. Observation indicates that a capillary effect of infusing matrix may push fibers apart before curing. A compressive mold permits squeezing out excess matrix and maintaining fiber spacing uniformity.

In compliance with the statute, the configurations have been described in language more or less specific as to structural and methodical features. It is to be understood, however, that the configurations are not limited to the specific features shown and described. The configurations are, therefore, claimed in any of their forms or modifications within the proper scope of the appended claims appropriately interpreted in accordance with the doctrine of equivalents.

TABLE OF REFERENCE NUMERALS FOR FIGURES

| | |
|---|---|
| 10 | element |
| 12 | segment |
| 14 | segment joint |
| 16 | support |
| 18 | fibers |
| 20 | segment |
| 22 | gap |
| 24 | tubesheet |
| 26 | tubesheet |

-continued

TABLE OF REFERENCE NUMERALS FOR FIGURES

| | |
|---|---|
| 30 | element |
| 32 | segment |
| 34 | segment joint |
| 36 | support |
| 38 | fibers |
| 42 | gap |
| 44 | tubesheet |
| 46 | tubesheet |
| 70 | element |
| 72 | segment |
| 74 | segment joint |
| 78 | fibers |
| 80 | segment |
| 82 | gap |
| 84 | tubesheet |
| 86 | tubesheet |
| 90 | facesheet |
| 92 | compliance material |
| 94 | facesheet portion |
| 100 | gas separation module |
| 102 | shell |
| 104 | rim |
| 106 | inlet port |
| 108 | feed |
| 110 | outlet port |
| 112 | retentate |
| 114 | outlet port |
| 116 | permeate |
| 118 | fiber |
| 130a | element |
| 130b | element |
| 132 | veil |
| 134 | segment joint |
| 136 | support |
| 138 | fibers |
| 140 | segment joint |
| 142 | shim |
| 144 | tubesheet |
| 146 | tubesheet |
| 148 | matrix film |
| 150 | sheet |
| 152 | slot |
| 160 | sheet |
| 162 | joint material |
| 164 | veil |
| 170 | mold |
| 172 | clamp |
| 174 | ring |
| 176 | expansion liner |
| 180 | mold |
| 182 | clamp |
| 184 | moveable wall |
| 186 | expansion liner |
| 188 | fixed wall |
| 190 | element |
| 192 | veil |
| 194 | segment joint |
| 198 | fibers |
| 200 | system |
| 202 | ASM |
| 204 | fuel tank |
| 206 | air source |
| 208 | permeate |
| 210 | air feed |
| 212 | nitrogen-enriched air |

What is claimed is:

1. A gas separation module formation method comprising:
positioning a hollow fiber membrane material in association with at least one tubesheet segment joint;
applying a matrix to the hollow fiber membrane material and to the segment joint and curing the matrix, the at least one tubesheet segment joint containing a compliance material different from the matrix;
forming a feed tubesheet from the cured matrix and the at least one tubesheet segment joint; and forming a plurality of hollow fiber membranes from the hollow fiber membrane material, individual fibers having a feed end and a product end, the cured matrix encapsulating the feed end of the fibers, the feed tubesheet securing the feed end of the fibers, and the at least one tubesheet segment joint separating a plurality of segments of the feed tubesheet from one another; and applying a thermoplastic veil between layers of the plurality of hollow fiber membranes, the thermoplastic veil containing a material different from the matrix and increasing toughness of the feed tubesheet.

2. The method of claim 1 further comprising:

applying additional matrix to the hollow fiber membrane material and to at least one other tubesheet segment joint and curing the additional matrix, the at least one other segment joint containing a compliance material different from the additional matrix; and forming a product tubesheet from the cured additional matrix and the at least one other tubesheet segment joint, the cured additional matrix encapsulating the product end of the fibers, the product tubesheet securing the product end of the fibers, and the at least one other segment joint separating a plurality of segments of the product tubesheet from one another.

3. The method of claim 1 wherein applying the matrix comprises applying a matrix film, a liquid resin, or a combination thereof.

4. The method of claim 1 further comprising, prior to applying the thermoplastic veil, preparing a veil assembly by mounting a matrix film as the matrix on the thermoplastic veil.

5. The method of claim 1 wherein the at least one tubesheet segment joint is attached to a support and positioning the hollow fiber membrane material comprises winding the hollow fiber membrane material onto the support.

6. The method of claim 1 wherein forming the feed tubesheet and forming the plurality of hollow fiber membranes comprises machining the cured matrix and the hollow fiber membrane material and opening the feed end of the fibers.

7. The method of claim 1 wherein the matrix further comprises nanosilica particles.

8. A gas separation module formation method comprising:
positioning a hollow fiber membrane material in association with at least one tubesheet segment joint;

applying a matrix to the hollow fiber membrane material and to the segment joint and curing the matrix, the at least one tubesheet segment joint containing a compliance material different from the matrix;

forming a feed tubesheet from the cured matrix and the at least one tubesheet segment joint; and forming a plurality of hollow fiber membranes from the hollow fiber membrane material, individual fibers having a feed end and a product end, the cured matrix encapsulating the feed end of the fibers, the feed tubesheet securing the feed end of the fibers, and the at least one tubesheet segment joint separating a plurality of segments of the feed tubesheet from one another, wherein the compliance material is configured to allow expansion and contraction of the plurality of segments in a circumferential direction and wherein positioning the hollow fiber membrane material in association with the at least one tubesheet segment joint comprises machining at least one slot in the cured matrix and inserting the at least one tubesheet segment joint in the at least one slot in association with the hollow fiber membrane material.

9. The method of claim 8 wherein the matrix further comprises nanosilica particles.

10. The method of claim 8 wherein the at least one tubesheet segment joint is attached to a support and positioning the hollow fiber membrane material comprises winding the hollow fiber membrane material onto the support.

11. A gas separation module formation method comprising:

positioning a hollow fiber membrane material in association with at least one tubesheet segment joint;

applying a matrix to the hollow fiber membrane material and to the at least one tubesheet segment joint, the matrix containing an adhesive or a resin or both and the at least one tubesheet segment joint containing a compliance material different from the matrix;

placing the at least one tubesheet segment joint, a portion of the hollow fiber membrane material, and the matrix in a mold;

applying pressure to the hollow fiber membrane material and the at least one tubesheet segment joint in a radial direction;

while applying the pressure and additionally applying heat, curing the matrix in the mold;

machining the cured matrix and the hollow fiber membrane material;

forming a feed tubesheet from the machined, cured matrix and the at least one tubesheet segment joint;

forming a plurality of hollow fiber membranes from the hollow fiber membrane material, individual fibers having a feed end and a product end, and opening the feed end of the fibers, the cured matrix encapsulating the feed end of the fibers, the feed tubesheet securing the feed end of the fibers, and the at least one tubesheet segment joint separating a plurality of segments of the feed tubesheet from one another; and forming a rim containing the matrix around the feed tubesheet.

12. The method of claim 11 further comprising mounting a resin film as the matrix on a thermoplastic veil and applying the thermoplastic veil and the resin film between layers of the plurality of hollow fiber membranes, the thermoplastic veil containing a material different from the matrix and increasing toughness of the feed tubesheet.

13. The method of claim 11 wherein positioning the hollow fiber membrane material comprises winding the hollow fiber membrane material onto a cylindrical support and the feed tubesheet has a circular perimeter.

14. The method of claim 11 wherein positioning the hollow fiber membrane material comprises winding the hollow fiber membrane material onto a support including a column with a rectangular cross-section and the feed tubesheet has a rectangular perimeter.

15. The method of claim 11 wherein forming the feed tubesheet comprises stacking a plurality of segments of a feed tubesheet, each segment having a rectangular perimeter, with the at least one tubesheet segment joint between the plurality of segments.

16. The method of claim 11 wherein the matrix further comprises nanosilica particles and the rim further comprises carbon fibers or nano-silica particles or both structurally reinforcing the rim.

* * * * *